March 22, 1949.  W. F. BERCK  2,465,190

VARIABLE RATIO PLANETARY TRANSMISSION

Filed Aug. 8, 1945

INVENTOR.
WILLIAM F. BERCK
BY
Mellin, Aurich & Hanscom
ATTORNEYS

UNITED STATES PATENT OFFICE 2,465,190

VARIABLE RATIO PLANETARY TRANSMISSION

William F. Berck, Hayward, Calif., assignor to Ralph N. Brodie Company, Oakland, Calif., a corporation of California Application August 8, 1945, Serial No. 609,544

10 Claims. (Cl. 74—681)

This invention relates generally to transmission mechanisms, and is more particularly directed to transmission mechanisms of the planetary gear type.

It is the principal object of the present invention to provide an improved efficient planetary gear transmission mechanism whose ratio of transmission can be selectively varied by exceedingly small increments, and which is capable of positive drive transmission between the driving and driven elements with a comparatively low overall torque.

One form which the invention may assume is exemplified in the following description and illustrated by way of example in the accompanying drawings, in which.

Figure 7:
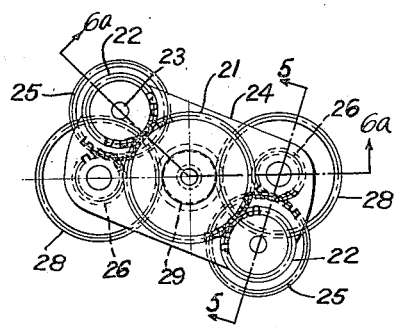
Fig. 7 is a plan view of the upper planet carrier.
Figure 2:
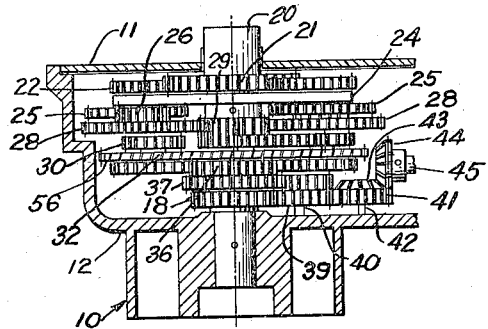
Fig. 2 is a fragmentary view in longitudinal section through the transmission housing, disclosing the transmission gears in full.
Figure 6:
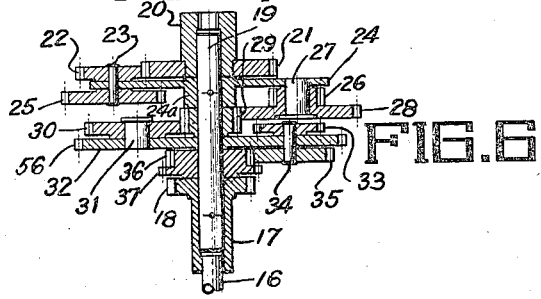
Fig. 6 is a cross-sectional view through the upper and lower planet carriers, the lower half thereof being taken along the line 6—6 of Fig. 3 and the upper half along the line 6a—6a of Fig. 7.
Figure 5:
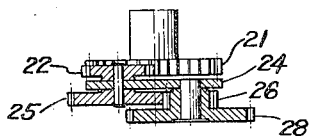
Fig. 5 is a sectional view through the upper planet carrier taken on line 5—5 of Fig. 8.
Figure 4:
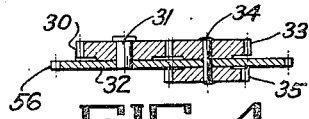
Fig. 4 is a sectional view through the lower planet carrier taken on line 4—4 of Fig. 3.
Figure 3:
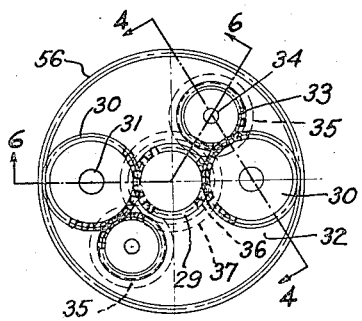
Fig. 3 is a plan view of the lower planet carrier, showing the mounting of the gears thereon.
Figure 1:
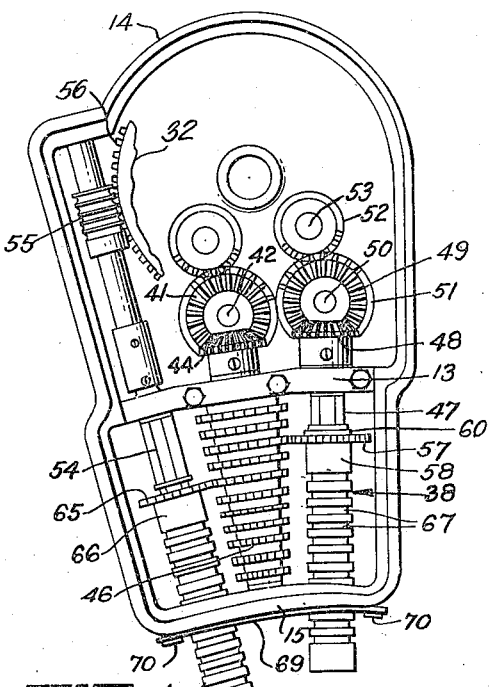
Fig. 1 is a plan view of the transmission unit embodying the features of the present invention with the cover of the casing removed and with the upper and lower planet carriers also removed in order to show certain features of construction.

Although the transmission mechanism disclosed on the drawings is useful for many purposes, it is particularly designed for use in obtaining changes in transmission ratios between the driving and driven elements in relatively small fractional amounts. More specifically, the transmission has unusual value as a calibrating device between the measuring mechanism and the counting or indicating mechanism of a meter.

The embodiment illustrated in the drawings includes a casing 10 enclosing the transmission mechanism, and comprising opposed spaced substantially parallel top and bottom walls 11, 12, with the latter provided with a bearing web 13 intermediate the end walls 14, 15. A drive shaft 16, suitably secured to a longitudinally extending hub 17 of a driving pinion 18 journaled within the bottom casing wall 12, has its forward extension 19 projecting across the transmission casing for rotatable reception within the driven shaft 20 of the transmission, which is journaled in the top wall 11 of the casing. A driven sun gear 21 is attached to the driven shaft 20 and meshes with planet pinions 22 secured to shafts 23 rotatably mounted in a planet gear carrier 24 secured to the drive shaft extension 19. The afore-mentioned planet pinions 22 are each secured to a shaft 23 on one side of the carrier 24 integral with a hub 24a, and are rotatable as a unit with a planet gear 25 secured to the shaft 23 on the other side of the planet carrier. Each planet gear 25 meshes with a second planet pinion 26 rotatable on a stud 27 fixed to the carrier 24, which is integral with or secured to another planet gear 28 meshing with an intermediate sun gear 29 rotatably mounted on the drive shaft extension 19.

The intermediate sun gear 29 meshes with planetary idlers 30 rotatable on studs 31 secured to a driven planetary carrier 32, which may be driven at various relative speeds. Each idler 30 meshes with a planet pinion 33 fixed on one side of the carrier 32 to a shaft 34 rotatably mounted therein. The shaft 34 projects from the other side of the carrier where a driven planet gear 35 is secured to it, meshing with a driving sun gear 36 rotatably mounted on the drive shaft extension 19. This sun gear is integral, or otherwise secured to rotate, with a primary driven gear 37, which is rotated by the drive gear 18 through a suitable variable speed transmission 38.

The variable speed transmission is driven from the drive gear 18 secured to the drive shaft. The drive gear 18 meshes with an idler 39 rotatably mounted on a stud 40 fixed to the bottom casing wall 12, which engages a gear 41 rotatably mounted on another stud 42 fixed to this wall, to which is secured a bevel pinion 43 meshing with a companion bevel gear 44 attached to the driving shaft 45 of the variable speed transmission 38. This shaft is rotatably mounted in the casing web 13 and in the end wall 15 of the casing.

The drive shaft 45 has keyed or otherwise suitably fixed thereto a plurality of stepped gears 46 reducing progressively in size from the largest gear at one end to the smallest gear at the other end; in effect forming a cone gear. Positioned at one side of this cone gear, and disposed in parallel relation to the peripheries of its several gears, is a primary jack shaft 47 journaled in the casing web 13 and having a bevel pinion 48 fixed to its inner end meshing with a companion bevel gear 49 rotatably mounted on a stud 50 secured to the bottom casing wall 12 and fixed to a gear 51 meshing with an idler 52 revoluble on a stud 53 fixed to the casing wall 12, which, in turn, meshes with the primary driven gear 37, which is integral with the driving sun gear 36.

A secondary jack shaft 54 is journaled in the casing web 13, being disposed on the opposite side of the gear cone 46 in a manner similar to the disposition of the primary shaft 47. A worm 55 is secured to this shaft and meshes with a worm wheel 56, which is the peripheral portion of the driven planetary carrier 32.

An axially adjustable primary gear 57 is secured in driving relation on the primary shaft 47, and is shiftable thereon to mesh with any one of the cone gears 46. To this end, the primary gear is secured on the inner end of an elongated sleeve 58 which extends through an opening 59 in the end wall 15 of the casing and is axially slideable on the shaft 47. The primary gear 57 may be secured on the sleeve 58 by any suitable means, such as a slide snap ring 60 partly submerged in a circular groove formed in said sleeve, and said sleeve and gear are splined to rotate with the shaft.

A secondary gear 65 is mounted in a similar manner on an elongated sleeve 66 slideably splined on the secondary jack shaft 54. Both sleeves 58, 66 are provided with a plurality of relatively spaced circular grooves 67 corresponding in number and relative spacing with the several cone gears comprising the composite gear cone 46.

Mounted on the casing wall 15 is a retaining plate 69 adjustably clamped to the wall 15 by means of clamp screws 70. The plate 69 engages the grooves 67 in the sleeves 58 and 66 and thus, when clamp screws 70 are tightened, clamps the sleeve in selected position. By loosening the screws 70 and disengaging the plate 69 from the grooves 67, either or both sleeves can be moved axially to another selected position to bring the desired cone gears into mesh.

It is apparent from the preceding description of the transmission mechanism that the driving ratio between the drive shaft 16 and the primary driving sun gear 36 may be varied by shifting the primary gear 57 into selective engagement with the desired gear of the composite cone gear 46. Similarly, the transmission ratio between the drive shaft 16 and the worm wheel planet carrier 32 may be varied by shifting the secondary gear 65 into engagement with a selected cone gear 46. By virtue of the different combinations of ratios of transmission with respect to the drive shaft that the worm wheel carrier 32 and the driving sun gear 36 can be operated, a large number of transmission ratios between the drive shaft 16 and the ultimately driven shaft 20 can be correspondingly obtained. In the specific arrangement disclosed, the number of different transmission ratios possible is a square of the number of gears comprising the composite cone gear 46.

The variable drive between the driving pinion 18 and the driving sun gear 36 is such as to provide a relatively coarse increment of adjustment in the rotation of the driven shaft 20 with respect to the driving shaft 16. On the other hand, the variable drive between this pinion 18 and the worm wheel carrier 32 is such as to provide a relatively fine increment of adjustment in the rotation of the driven shaft relative to the drive shaft. Such fine adjustment is obtained, in the instant case, through suitable choice of the transmission ratio between the pinion 18 and worm 55. Since the rotation of the driven shaft 20 is dependent upon the fixed speed of planet carrier 24 and upon the relative speeds and directions of rotation of the primary sun pinion 36 and the variably driven carrier 32, many different ratios of transmission can be obtained by the mechanism herein described.

It is to be noted that there are, in effect, two planetary transmissions contained within the gear case, whose motions are combined to provide the ultimate result on the driven shaft. The first, or primary, transmission provides a variable speed drive on the intermediate sun gear 29, depending upon the speeds and rotational directions of the driving sun gear 36 and worm wheel carrier 32. The second, or secondary, planetary transmission compounds the motion of the intermediate sun gear 29 and the secondary planetary carrier 24, which is secured to the drive shaft extension 19, to produce a resultant drive on the ultimate driven sun gear 21 secured to the driven shaft 20.

If it is assumed that the drive shaft 16 is rotating in a clockwise direction, the primary driving sun gear 36 will be driven through the gear train 18, 39, 41, 43, 44, 46, 57, 48, 49, 51, 52 and 37 including the variable speed sliding gear transmission 38 in a counterclockwise direction. Assuming that the worm wheel carrier 32 is stationary the primary planet gear train 36, 35, 33, 30, 29 is such that counterclockwise rotation of the primary driving sun gear 36 effects clockwise rotation of the intermediate sun gear 29 rotatably mounted on the drive shaft extension 19. The drive from the driving gear 18 through the cone gear transmission 38 to the worm wheel carrier 32 is such that the latter is rotated in a clockwise direction. If the driving sun gear 36 were stationary, each revolution of the carrier 32 would impart more than one revolution to the intermediate sun gear 29 in a clockwise direction, depending upon the gear ratio in the primary planetary train 36, 35, 33, 30, 29. Since the driving sun gear 36 and planet carrier 32 are both tending to drive the intermediate sun gear 29 in a clockwise direction, their motions add to one another to produce a resultant, greater rotation of the sun gear 29 than each of the former imparts to it alone.

Assuming that the secondary planet carrier 24 is stationary, the arrangement of the planet gears 28, 26, 25, 22 carried thereon and the drive from the intermediate sun gear 29 to the driven sun gear 21 is such as to tend to drive the latter in a counterclockwise direction. The secondary planet carrier, being fixed to the drive shaft extension 19, rotates in a clockwise direction and tends to carry the driven sun gear 21 around with it in a clockwise direction. Assuming the intermediate sun gear 29 to be stationary, each revolution of the secondary carrier 24 tends to rotate the driven sun gear more than one revolution, depending upon the gear ratio in the secondary planetary train 29, 28, 26, 25, 22, 21. Since the rotating intermediate sun gear 29 is tending to drive the driven sun gear 21 in a counterclockwise direction, the net result is for the rotating intermediate sun gear 29 to subtract from the clockwise rotation imparted to the driven shaft 20 by the clockwise rotating secondary carrier 24, which carries the secondary planet gears 28, 26, 25, 22 around with it in a clockwise direction.

While the ratios of transmission between the various gears can be suitably chosen in accordance with the use to which the transmission is to be put, the various gear trains that have been employed are such as to permit a large number of relatively minute fractional increments of adjustment to be made in the transmission ratio between the drive and driven shafts. For example, the eleven cone gears 46 shown in the drawings permit one hundred and twenty-one variations of the transmission ratio to be effected. The smallness of the increments of adjustment and the mode of operation of the planetary transmission can perhaps be better explained by reference to an actual transmission design.

In the illustrated embodiment of the invention, the transmission ratio between the primary drive shaft 16 and cone gear shaft 45 is one to one by suitably choosing the numbers of teeth on the driving pinion 18, idler 39, driven gear 41, bevel pinion 43 and bevel gear 44. Similarly, the ratio of transmission between the primary jack shaft 47 and driving sun gear 36 is one to one, through suitable choice in the numbers of teeth on the bevel gears 48, 49, pinion 51, idler gear 52 and driven gear 37. These two gear trains are interconnected through the coarse adjustment jack shaft gear 57 and the selected cone gear 46 with which it meshes. In view of the fact that the transmission ratios between the driving pinion 18 and cone gear drive shaft 45, and between the primary jack shaft 47 and primary sun gear 36, are both one to one, the transmission ratio between the drive shaft 16 and driving sun gear 36 will be the same as the transmission ratio between the selected cone gear 46 and its meshing primary jack shaft gear 57. The largest gear of the cone gear stack has 22 teeth and the smallest gear 12 teeth, each successive gear from the largest to the smallest progressively having one less tooth on its periphery. The primary jack shaft gear 57 has 20 teeth, providing eleven possible transmission ratios between the drive shaft 16 and driving sun gear 36 of from 22/20 to 12/20; or 1.1 to 0.6.

The transmission ratio between the worm 55 and the worm wheel 56 is chosen, in the particular example being described, as 22 to 1. In view of the one to one ratio between the drive shaft 16 and the cone gear drive shaft 45, the transmission ratio between the driving shaft 16 and the worm wheel planet carrier 32 will be twenty-two times the ratio between the cone gear drive shaft 45 and the secondary driven gear 65.

In the primary planetary train, the driving sun gear 36 may be assumed to have twenty teeth, the planet gear 35 meshing therewith twenty teeth, the planet pinion 33 fixed to rotate with this planet gear sixteen teeth, and the intermediate driven sun gear 29 has sixteen teeth. (The number of teeth on the planet idler 30 is immaterial.) The ratio of transmission between the primary driving sun pinion 36 and the intermediate driven sun gear 29 is, therefore, one to one, with the intermediate sun gear 29 rotating in the opposite direction to that of the primary driving sun pinion 36. Since the latter is being rotated in a counterclockwise direction upon clockwise movement of the primary drive shaft, the sun gear 29 will be rotated in a clockwise direction.

If it is assumed that the planet gear 28 on the secondary carrier 24 has thirty-two teeth and the pinion 26 integral therewith twelve teeth, and if it be further assumed that the planet gear 25 meshing with the latter pinion has twenty-four teeth and rotates a sixteen-tooth planet gear 22 secured to its shaft 23, which meshes with the driven sun gear 21 having thirty-two teeth, and further assuming that the planet gear carrier 24 is stationary, it is evident that each revolution of the intermediate sun gear 29 in a clockwise direction effects one-eighth of a revolution of the driven sun gear 21 in a counterclockwise direction.

If the driving sun gear 36 were stationary, the one to one ratio of the primary planet gear train 36, 35, 33, 30, 29 would cause one revolution of the worm wheel carrier 32 in a clockwise direction to produce two revolutions of the intermediate sun gear 29 in a clockwise direction. In other words, the rotation of the worm wheel planet carrier 32 produces double the amount of its rotation on the intermediate driven sun gear 29. Correspondingly, assuming the intermediate driven sun gear 29 to be stationary, each revolution of the secondary planet carrier 24 in a clockwise direction would produce one and one-eighth revolutions of the driven sun gear 21 in a clockwise direction, because of the eight to one ratio of transmission in the planet gear train from the intermediate sun gear 29 to the driven sun gear 21, or a total of 1.125 revolutions of the driven sun gear.

Since the secondary planet carrier 24 is fixed to rotate with the primary drive shaft 16 each revolution of such carrier with the intermediate sun gear 29 stationary would rotate the driven sun gear 1.125 revolutions. However, since the intermediate sun gear 29 is not stationary, it has the effect, as afore-mentioned, of rotating the driven sun gear 21 and driven shaft 20 in a counterclockwise direction, decreasing the speed of the latter by one-eighth of the speed of the intermediate sun gear. In other words, the rotation of the driven shaft 20 for each revolution of the drive shaft 16 may be expressed as follows:

(1) $$S_U = 1.125 - \tfrac{1}{8} S_I$$

in which $S_U$ = the rotation of the driven shaft 20; and
$S_I$ = the rotation of the intermediate sun gear 29

The rotation imparted to the intermediate sun gear 29 for each revolution of the drive shaft 16 is equal to twice the rotation of the worm wheel carrier 32 plus the rotation of the driving sun gear 36, or (2) $$S_I = 2W + S_D$$

in which $W$ = the rotation of worm wheel carrier 32; and
$S_D$ = the rotation of the driving sun gear 36

Substituting for $S_I$ in Equation 1, as determined from Equation 2, (3) $$S_U = 1.125 - 0.125(2W + S_D)$$

The extent of rotation of the primary carrier 32 with respect to the driving shaft 16 has been shown above to be ½₂ of the transmission ratio between a selected cone gear 46 and the secondary jack shaft gear 65. Similarly, the transmission ratio between the driving shaft 16 and the primary driving sun gear 36 has been shown to be the transmission ratio between the selected cone gear 46 and the co-meshing primary jack shaft gear 57. Accordingly, the rotation $W$ of the carrier 32 with respect to the driving shaft 16 may be expressed as follows:

(4)
$$W = 1/22 \times \frac{P}{R}$$

in which

P = number of teeth on selected cone gear 46, and
R = 20 = number of teeth on secondary jack shaft gear 65

The rotation $S_D$ of the sun gear 36 relative to the drive shaft 16 may be expressed in the following manner:

(5)
$$S_D = \frac{F}{G}$$

in which

F = number of teeth on selected cone gear 46, and
G = 20 = number of teeth on primary jack shaft gear 57

Substituting the foregoing in Equation 3 above;

$$S_U = 1.125 - 0.125 \left( \frac{2P}{22 \times 20} + \frac{F}{20} \right)$$

or (6)  $S_U = 1.125 - 0.0005681818(P + 11F)$

From the foregoing Equation 6 it can readily be demonstrated that very fine increments of adjustment in the transmission ratio are possible. Assuming that the primary jack shaft gear 57 is meshing with the largest cone gear 46 having twenty-two teeth, factor F, and that the secondary jack shaft gear 65 is also meshing with this twenty-two-tooth cone gear 46, factor P, the number of revolutions which the driven shaft 20 makes for each revolution of the driving shaft 16 may be computed by substituting in the above Formula 6, and will be found to be 0.975.

Again, assuming that the coarse adjustment obtained by driving through the cone transmission 38 onto the primary driving sun gear 36 remains unchanged, that is, that the primary jack shaft gear 57 meshes with the twenty-two-tooth gear, factor F, but that the fine adjustment secondary gear 65 has now been meshed with the next gear having twenty-one teeth, factor P, substitution in the above formula shows that the driven shaft 20 is rotated 0.97556818 revolutions for each revolution of the driving shaft. In other words, the rotation of the driven shaft with respect to the driving shaft has increased by 0.00056818. If the primary jack shaft gear 57 remains meshing with the twenty-two-tooth gear, factor F, and the secondary jack shaft gear 65 is meshed with the twenty-toothed gear, factor P, it will be found that the rotation of the driven shaft 20 for each revolution of the driving shaft 16 will be increased still further by 0.00056818 or to 0.976136.

Further changes in transmission ratio can be made by shifting the fine adjustment gear 65 along the cone 46. For each fixed position of the coarse adjustment jack shaft gear 57 there are eleven positions of the fine adjustment gear 65, and since the coarse adjustment gear has eleven positions, the net result is to provide one hundred twenty-one possible transmission ratios, which, as demonstrated above, can vary by as little as 0.00056818 for the specifically designed transmission referred to.

In the specific example given, the transmission operates with a ratio in the neighborhood of one to one for each selected position of the pinion and secondary jack shaft gears. For instance, 0.975, 0.97556818, etc. This furnishes an efficient power transmission arrangement, since the entire device can operate with a lesser overall torque than heretofore inherent in transmissions of the type under consideration.

It is, accordingly, apparent that a planetary transmission has been devised in which a large number of very small increments of adjustment can be made in the transmission ratio between the driving and driven members. The gear drive is at all times positive in character, providing a simple and effective way of compensating for errors that would otherwise be introduced in meter readings due to temperature and pressure changes. Although particular reference has been made to the metering field, the transmission device has exceptional utility in other situations in which a positive transmission means capable of selective adjustment to produce exceedingly minute variations in transmission ratio is required.

Although a preferred form of the invention has been shown and described, and particular reference made to a specific design, it is to be understood that various changes may be made in the construction and relationship of the parts by those skilled in the art without departing from the spirit of the invention as defined in the appended claims.

Having thus described my invention, what I claim and desire to obtain by Letters Patent is:

1. In transmission mechanism of the nature disclosed, a drive member, a driven member, an intermediate sun gear rotatable relative to said members, a first planetary gear train connecting said members and including a driven sun gear fixed to said driven member, a planet carrier fixed to said drive member and planet gearing rotatably mounted on said carrier and meshing with said sun gears, a second planetary gear train including a driving sun gear and a second planet carrier rotatable relative to each other and to said members and a second planet gearing rotatably mounted on said second carrier and meshing with said intermediate sun gear and driving sun gear, and speed change means driven by said drive member for driving said driving sun gear and second carrier at variable relative speeds.

2. In transmission mechanism of the nature disclosed, a drive shaft, a driven shaft, an intermediate sun gear rotatable relative to said shafts, a first planetary gear train connecting said shafts and including a driven sun gear fixed to said driven shaft, a planet carrier fixed to said drive shaft and planet gearing rotatably mounted on said carrier and meshing with said sun gears, a second planetary gear train including a driving sun gear and a second planet carrier rotatable relative to each other and to said shafts and a second planet gearing rotatably mounted on said second carrier and meshing with said intermediate sun gear and driving sun gear, and variable speed change means between said driving sun gear and second carrier, said means being driven by said drive shaft.

3. In transmission mechanism of the nature disclosed, a drive shaft, a driven shaft, an intermediate sun gear rotatable relative to said shafts, a first planetary gear train connecting said shafts and including a driven sun gear fixed to said driven shaft, a planet carrier fixed to said drive shaft and planet gearing rotatably mounted on said carrier and meshing with said sun gears, a second planetary gear train including a driving sun gear and a second planet carrier rotatable relative to each other and to said shafts and second planet gearing rotatably mounted on said second carrier and meshing with said intermediate sun gear and driving sun gear, and speed change means driven by said drive shaft for driving said driving sun gear and second carrier in opposite directions at variable speeds.

4. In transmission mechanism of the nature disclosed, drive and driven shafts, an intermediate sun gear rotatable relative to said shafts, a first planetary gear train connecting said shafts and including a driven sun gear fixed to said driven shaft, a planet carrier fixed to said drive shaft and planet gearing rotatably mounted on said carrier and meshing with said sun gears, a second planetary gear train including a driving sun gear and a second planet carrier rotatable relative to each other and to said shafts and second planet gearing rotatably mounted on said second carrier and meshing with said intermediate sun gear and driving sun gear, said shafts, sun gears and carriers being arranged coaxially, and speed change means driven by said drive shaft for driving said driving sun gear and second carrier at selected speeds.

5. In transmission mechanism of the nature disclosed, coaxial drive and driven shafts, an intermediate sun gear rotatable on said drive shaft, a first planetary gear train connecting said shafts and including a driven sun gear fixed to said driven shaft, a planet carrier fixed to said drive shaft and planet gearing rotatably mounted on said carrier and meshing with said sun gears, a second planetary gear train including a driving sun gear and a second planet carrier both rotatable on said drive shaft relative to each other and second planet gearing rotatably mounted on said second carrier and meshing with said intermediate sun gear and driving sun gear, and speed change means driven by said drive shaft for driving said driving sun gear and second carrier at selected speeds.

6. In transmission mechanism of the nature disclosed, drive and driven shafts, an intermediate sun gear rotatable relative to said shafts, a first planetary gear train connecting said shafts and including a driven sun gear fixed to said driven shaft, a planet carrier fixed to said drive shaft and planet gearing rotatably mounted on said carrier and meshing with said sun gears, said planet gearing being such that said intermediate sun gear tends to rotate said driven sun gear in a direction opposite to that of said intermediate sun gear, a second planetary gear train including a driving sun gear and a second planet carrier rotatable relative to each other and to said shafts and second planet gearing rotatably mounted on said second carrier and meshing with said intermediate sun gear and driving sun gear, said second planet gearing being such that said driving sun gear tends to rotate said intermediate sun gear in a direction opposite to that of said driving sun gear, and speed change means driven by said drive shaft for driving said driving sun gear and second carrier in opposite directions at selected speeds.

7. In transmission mechanism of the nature disclosed, drive and driven shafts, an intermediate sun gear rotatable relative to said shafts, a first planetary gear train connecting said shafts and including a driven sun gear fixed to said driven shaft, a planet carrier fixed to said drive shaft and planet gearing rotatably mounted on said carrier and meshing with said sun gears, said planet gearing being such that said intermediate sun gear tends to rotate said driven sun gear in a direction opposite to that of said intermediate sun gear, a second planetary gear train including a driving sun gear and a second planet carrier rotatable relative to each other and to said shafts and second planet gearing rotatably mounted on said second carrier and meshing with said intermediate sun gear and driving sun gear, said second planet gearing being such that said driving sun gear tends to rotate said intermediate sun gear in a direction opposite to that of said driving sun gear, said shafts, sun gears, and carriers being arranged coaxially, and speed change means driven by said drive shaft for driving said driving sun gear and second carrier in opposite directions at selected speeds.

8. In transmission mechanism of the nature disclosed, coaxial drive and driven shafts, an intermediate sun gear rotatable on said drive shaft, a first planetary gear train connecting said shafts and including a driven sun gear fixed to said driven shaft, a planet carrier fixed to said drive shaft and planet gearing rotatably mounted on said carrier and meshing with said sun gears, said planet gearing being such that said intermediate sun gear tends to rotate said driven sun gear in a direction opposite to that of said intermediate sun gear, a second planetary gear train including a driving sun gear and a second planet carrier both rotatable on said drive shaft relative to each other and second planet gearing rotatably mounted on said second carrier and meshing with said intermediate sun gear and driving sun gear, said second planet gearing being such that said driving sun gear tends to rotate said intermediate sun gear in a direction opposite to that of said driving sun gear, and speed change means driven by said drive shaft for driving said driving sun gear and second carrier in opposite directions at selected speeds.

9. In a transmission mechanism of the nature disclosed, coaxial drive and driven shafts, an intermediate sun gear rotatable on said drive shaft, a first planetary gear train connecting said shafts and including a sun gear fixed to said driven shaft, a planet carrier fixed to said drive shaft and planet gearing rotatably mounted on said carrier and meshing with said sun gears, said planet gearing being such that said intermediate sun gear tends to rotate the driven sun gear in a direction opposite to that of and at a slower speed than said intermediate sun gear, a second planetary gear train including a driving sun gear and a second planet carrier both rotatable on said drive shaft relative to each other and second planet gearing rotatably mounted on said second carrier and meshing with said first sun gear and driving sun gear, said second planet gearing being such that said driving sun gear tends to rotate said intermediate sun gear in a direction opposite to that of said driving sun gear, and speed change means driven by said drive shaft for driving said driving sun gear and second carrier in opposite directions at selected speeds.

10. A transmission mechanism of the nature disclosed, coaxial drive and driven shafts, an intermediate sun gear rotatable on said drive shaft, a driven sun gear fixed to the driven shaft, a planet carrier fixed to said drive shaft, a first planet gear rotatable on said carrier and meshing with said driven sun gear, a second planet gear fixed to rotate with said first planet gear, a third planet gear rotatable on said carrier and meshing with said second planet gear, a fourth planet gear fixed to rotate with said third planet gear and meshing with said intermediate sun gear, a driving sun gear and a second planet carrier both rotatable on said drive shaft relative to each other, a fifth planet gear rotatable on said second carrier and meshing with said driving sun gear, a sixth planet gear fixed to rotate with said fifth planet gear, an idler planet gear rotatable on said carrier and meshing with said intermediate sun gear and with said sixth planet gear, and speed change means driven by said drive shaft for driving said driving sun gear and second carrier in opposite directions at selected speeds.

WILLIAM F. BERCK.

REFERENCES CITED

The following references are of record in the file of this patent:

UNITED STATES PATENTS

| Number | Name | Date |
|---|---|---|
| 697,801 | Caffrey | Apr. 15, 1902 |
| 2,111,996 | Slye | Mar. 22, 1938 |
| 2,196,806 | Berck | Apr. 9, 1940 |
| 2,212,241 | Mayo | Aug. 20, 1940 |

FOREIGN PATENTS

| Number | Country | Date |
|---|---|---|
| 101,515 | Australia | July 15, 1937 |